US012145783B2

(12) United States Patent
White et al.

(10) Patent No.: US 12,145,783 B2
(45) Date of Patent: Nov. 19, 2024

(54) SECURITY DEVICES

(71) Applicant: ALGRETA SOLUTIONS LIMITED, Buckinghamshire (GB)

(72) Inventors: Matthew White, Balcombe (GB); Paul Churchett, High Wycombe (GB)

(73) Assignee: Algreta Solutions Limited, Buckinghamshire (GB)

( * ) Notice: Subject to any disclaimer, the term of this patent is extended or adjusted under 35 U.S.C. 154(b) by 156 days.

(21) Appl. No.: 16/825,752

(22) Filed: Mar. 20, 2020

(65) Prior Publication Data

US 2020/0299040 A1 Sep. 24, 2020

(30) Foreign Application Priority Data

Mar. 22, 2019 (GB) ..................................... 1904008
May 8, 2019 (GB) ..................................... 1906504

(51) Int. Cl.
*B65D 55/14* (2006.01)
*B65D 50/00* (2006.01)
*E05B 73/00* (2006.01)

(52) U.S. Cl.
CPC ............. *B65D 55/14* (2013.01); *B65D 50/00* (2013.01); *E05B 73/0041* (2013.01); *E05Y 2999/00* (2024.05)

(58) Field of Classification Search
CPC ........ B65D 55/14; B65D 50/00; B65D 41/32; B65D 23/08; B65D 45/00; B65D 55/02; B65D 55/12; B65D 55/04; B65D 55/06; B65D 55/08; E05B 73/0041; E05B 73/0052; E05Y 2900/602
USPC ............................................................ 70/63
See application file for complete search history.

(56) References Cited

U.S. PATENT DOCUMENTS 6,449,991 B1 * 9/2002 Hogan ................ E05B 73/0017 70/57.1
6,822,567 B2 11/2004 Durbin
6,912,878 B2 * 7/2005 Belden, Jr. ............. B65D 55/14 70/57.1
7,372,363 B2 5/2008 Durbin
(Continued)

FOREIGN PATENT DOCUMENTS

CN 201381027 Y * 1/2010 ......... E05B 73/0017
EP 1 274 912 B1 6/2005
EP 1 557 365 B1 3/2008

*Primary Examiner* — Nathan J Jenness
*Assistant Examiner* — Eric C Baldrighi
(74) *Attorney, Agent, or Firm* — Seed IP Law Group LLP

(57) ABSTRACT

A security device for locking to a container in blocking access to content of the container. The security device has a locking mechanism contained within a housing, the locking mechanism includes a slider for sliding within the housing between an unlocked state and a locking state; and a catch mounted within the housing for displacement relative to the slider. The catch has a blocking condition in which it blocks sliding of the slider between its unlocked and locking states, and an activated condition in which the catch is displaced from its blocking condition in response to an activating action applied externally to the security device, the catch reverting to its blocking condition on termination of application of the activating action. The security device further includes a component coupled to the slider for locking the security device to the container as aforesaid when the slider is in its locking state.

19 Claims, 7 Drawing Sheets

(56) References Cited

U.S. PATENT DOCUMENTS

| | | | | |
|---|---|---|---|---|
| 7,570,161 B2 * | 8/2009 | Necchi | E05B 73/0041 340/568.1 |
| 8,152,009 B2 * | 4/2012 | Hulin | E05B 73/0017 215/218 |
| 2004/0163430 A1 * | 8/2004 | Belden, Jr. | E05B 73/0041 70/57.1 |
| 2006/0070410 A1 * | 4/2006 | Fuss | E05B 73/0041 70/57.1 |
| 2009/0184121 A1 * | 7/2009 | Hulin | E05B 73/0017 220/230 |
| 2010/0242552 A1 * | 9/2010 | Sayegh | E05B 73/0041 70/58 |
| 2011/0140894 A1 * | 6/2011 | Sayegh | E05B 73/0041 340/572.8 |
| 2020/0157854 A1 * | 5/2020 | Piccoli | E05B 15/1607 |
| 2020/0240180 A1 * | 7/2020 | Yasin | B65D 45/32 |

* cited by examiner

SECURITY DEVICES

BACKGROUND

Technical Field

This invention relates to security devices for bottles or other containers, of the kind in which the security device is lockable to the container in blocking access to content of the container.

Description of the Related Art

A security device of the kind specified above for bottles is known for example from EP1557365 in which a device in the form of a sleeve with a closed end fits over the opening at the top of the bottle-neck blocking access to the bottle-content, and catch members pivoted to the sleeve are retained engaged under one or more arcuate lips or shoulders of the bottle-neck by a lock that locks the catches to the bottle and requires release in order subsequently to free the device from the bottle.

Bottle-security devices of the above kind have been used widely to deter theft where bottles of alcoholic and other drinks of premium quality and price have been offered for sale publicly. In particular, it is normal for such bottles to have the security device fitted to them individually in a retail or other sales-establishment before they are put on display or are otherwise within public-availability, and for the security device to be released from its bottle only at the time of sale. The locking of the device to the bottle advantageously deters a potential thief from stealing the bottle, because once the device has been locked to it, immediate normal access to the bottle-content is blocked and forced breaking of the device from the bottle is likely to spill and/or contaminate the content. Moreover, the existence of the security device locked to a bottle, outside the establishment is evidence that it has not been acquired legitimately through sale. Additionally the device will contain one or more security tags designed to activate detection gates. The detection gates are designed to prevent people moving through a location with a product where the security device has not been removed.

BRIEF SUMMARY

It is an object of the present invention to provide a security device of the specified kind that is of an improved form and potentially wider application than known forms.

According to one aspect of the present invention there is provided a security device for locking to a container in blocking access to content of the container, wherein the security device has a locking mechanism contained within a housing, the locking mechanism comprising: a slider for sliding within the housing between an unlocked state and a locking state; and a catch mounted within the housing for displacement relative to the slider, the catch having a blocking condition in which it blocks sliding of the slider between its unlocked and locking states, and an activated condition in which the catch is displaced from its blocking condition in response to an activating action applied externally to the security device, the catch reverting to its blocking condition on termination of application of the activating action; and wherein the security device further includes means coupled to the slider for locking the security device to the container as aforesaid when the slider is in its locking state.

The means coupled to the slider may comprise one or more flexible legs extending from the slider, and the one or more flexible legs may each have an individual foot for engagement with the container when the slider is in its locking state.

The slider may have one or more tab-projections for abutting the catch when the catch is in its blocking condition, to block sliding of the slider to its locking state from its unlocked state. The same, or a different one or more tab-projections, may abut the catch to block sliding of the slider to its unlocked state from its locking state.

According to a feature of the present invention a security device for locking to the neck of a bottle comprises a housing to cover the mouth of the bottle in blocking access to content of the bottle, a slider for sliding within the housing between an unlocked state and a locking state, a catch mounted within the housing in a blocking location where it blocks sliding of the slider between the unlocked and locking states, the catch being responsive to application to the security device of an externally-applied magnetic attraction to be displaced from its blocking location during application of the magnetic attraction, before returning to its blocking location on termination of application of the magnetic attraction, and means coupled to the slider for locking the security device to the bottle as aforesaid when the slider is in its locking state.

BRIEF DESCRIPTION OF THE SEVERAL VIEWS OF THE DRAWINGS

An example of a security device in accordance with the present invention for locking to a bottle, will now be described, by way of example, with reference to the accompanying drawings, in which.

DETAILED DESCRIPTION

Figure 1:
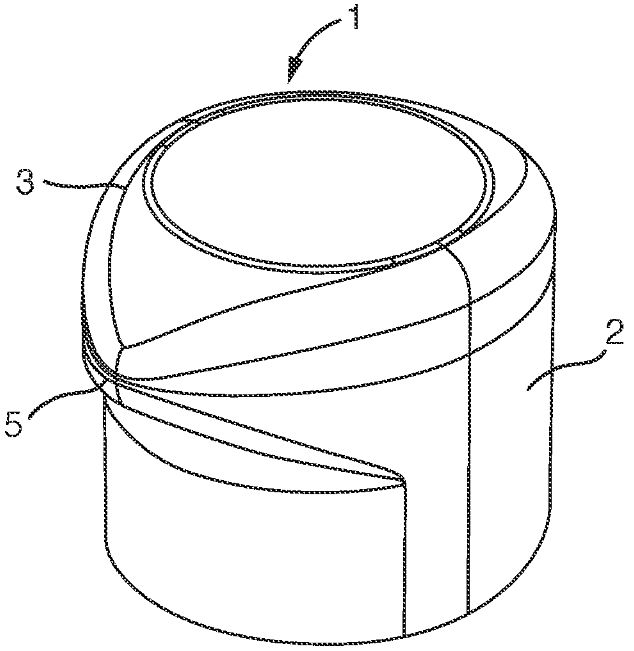
FIGS. 1 and 2 show the security device upright from above and from below respectively.
Figure 2:
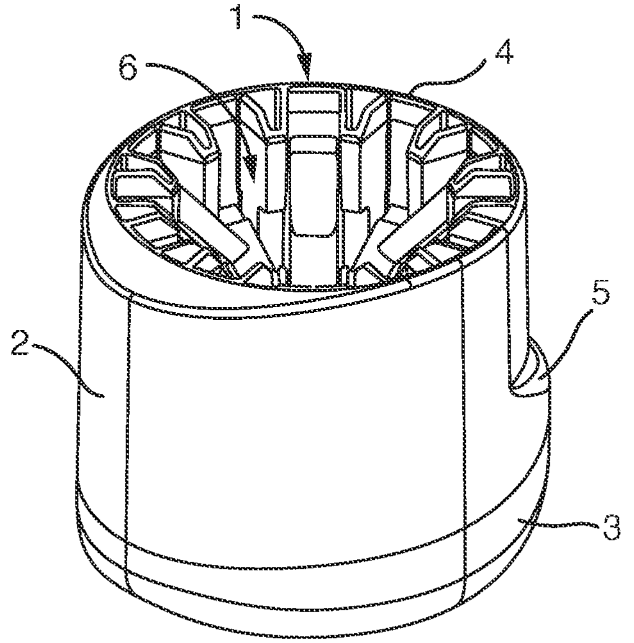
Figure 4:
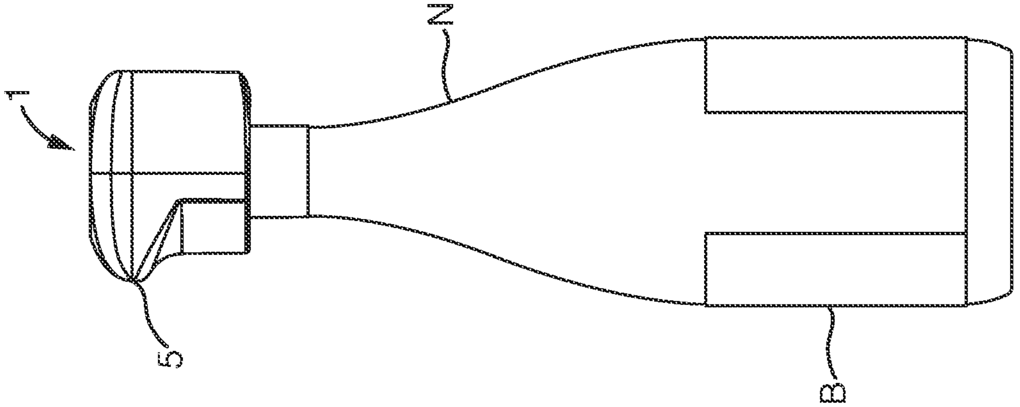
FIG. 4 shows the security device locked to the bottle.
Figure 3:
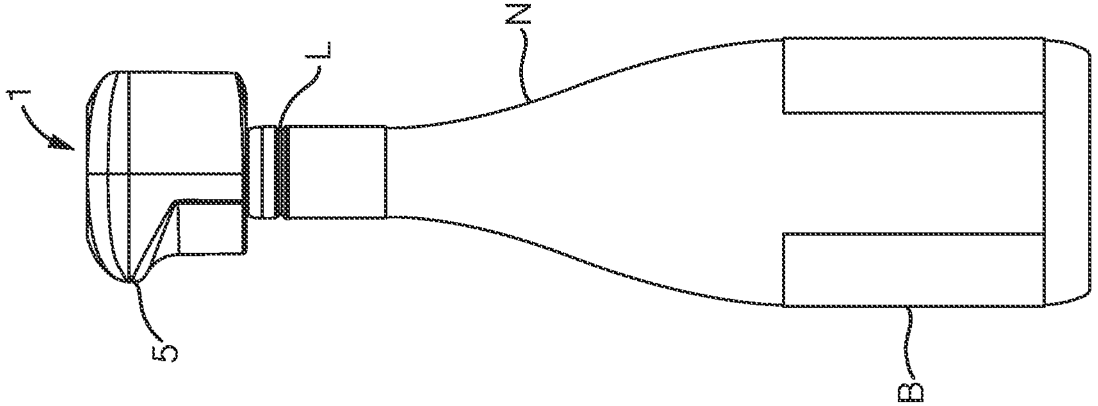
FIG. 3 shows the security device pre-set and located in preparation for locking to a bottle.

Referring to FIGS. 1 and 2, the bottle security device 1 has an outer generally-cylindrical housing 2 that is moulded of ABS (acrylonitrile-butadiene-styrene) plastics. The housing 2 is closed at its upper end by a closely-fitting cap 3 and has a circular bottom opening 4 at its lower end. The cap 3, which is welded ultrasonically to the housing 2, complements the housing 2 in configuring the device 1 externally as slightly-oval with a cross-section that flares into a nose projection 5, as also shown in FIGS. 3 to 5.

A locking mechanism 6 (visible partially within the opening 4 of FIG. 2) is contained within the housing 2, for locking the device 1 to the neck N of a bottle B in a way that precludes access to the normal cap- or cork-closure of the mouth of the bottle, and thence to the bottle-content, until the locking mechanism 6 is released from its locked state to its unlocked state. More particularly, as visible in FIG. 5, the locking mechanism 6 includes six flexible legs 7 that are equally spaced from one another around the inside of the housing 2, and are interspersed equally by six shorter flexible legs 8. The legs 7 and 8 are withdrawn wholly within the housing 2 (as in each of the representations of FIGS. 1 to 4) when the device 1 is in either of its pre-locking and locked states, and are for engaging under one or more shoulders, lips or other projections of the neck N for locking the device 1 securely to the bottle B; a single lip or shoulder L is shown in FIG. 3. However, when the locking mechanism 6 is in its unlocked state, both sets of legs 7 and 8 extend partially out from within the housing 2 through the bottom opening 4 (as illustrated in FIG. 5).

Figure 5:
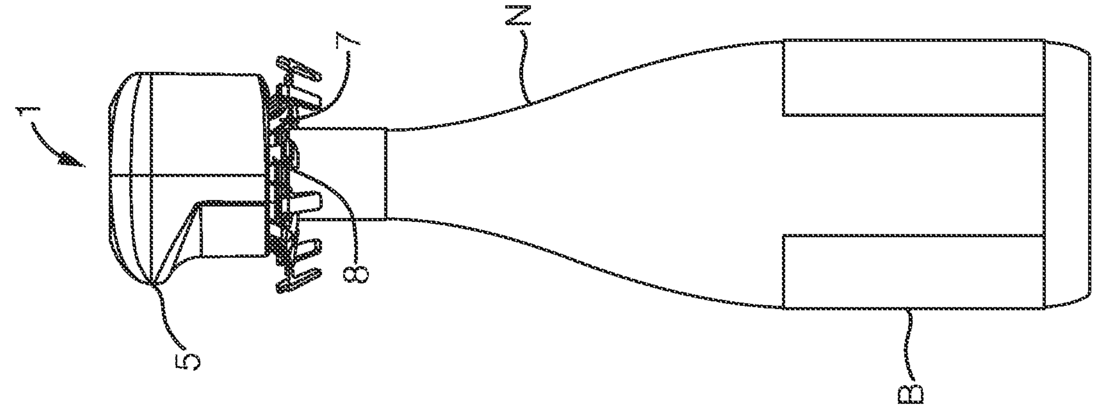
FIG. 5 shows the security device when fully released from locking to the bottle.
Figure 6:
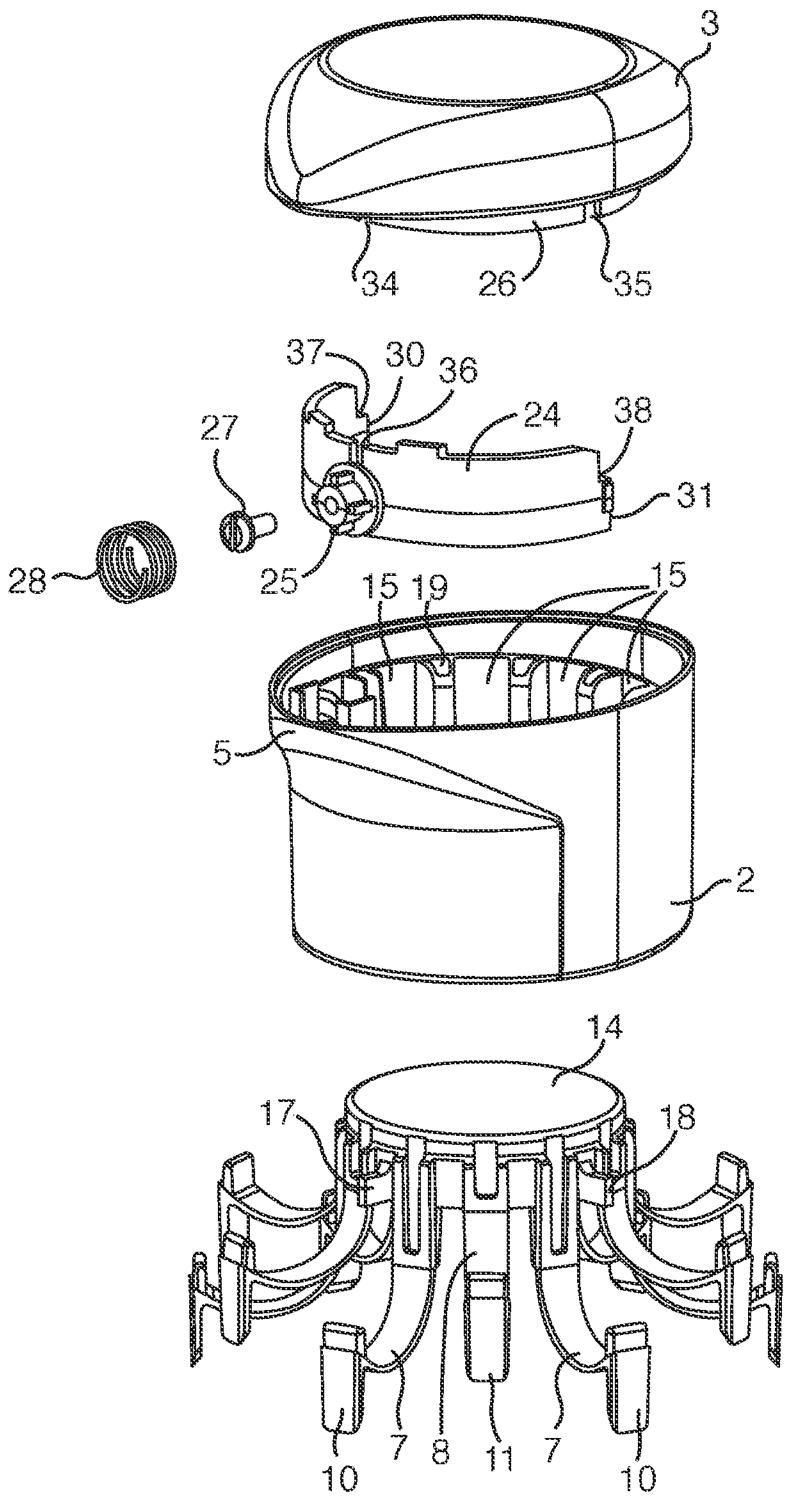
FIG. 6 is an exploded view of the security device, showing components of the security device individually in perspective.

Referring to FIG. 6, each leg 7 and 8 is a flat strip of a nylon or other plastics material, which, by virtue of a resilient bias established in it during manufacture, bends upwardly along its length where it extends outside the constraining confines of the housing 2 in the unlocked state of the mechanism 6 (see FIG. 5). The free ends of the legs 7 and 8 terminate individually in angled-down feet, each leg 7 terminating in a respective foot 10, and each leg 8 in a respective foot 11. The feet 10 of the set of legs 7, or the feet 11 of the set of shorter legs 8, are for engagement under a lip (such as the lip L of FIG. 3), a shoulder or other abutment edge against or under which they can engage on the bottle-neck N in retaining the device 1 locked to it.

Locking of the device 1 to the bottle B (the locked state of the device 1) can be carried out from either of the two states in which the security device 1 is in its pre-locking state (represented in FIGS. 1 to 3) or its unlocked state (represented in FIG. 5).

It is preferred to apply the device 1 to the bottle B with the device 1 in its pre-locking state as illustrated in FIG. 3, and to carry this out at the bottling station, namely at the location where the bottle is filled and closed by cap or cork, and any foil or other covering (omitted from the drawings) has been applied to the bottle-neck N over and around the closed mouth of the bottle; in the case of alcoholic beverages, these actions are usually carried out at the premises of the distillers.

When the security device 1 is in the pre-locking state and placed on top of the neck N of the bottle B as illustrated in FIG. 3, pushing it down forces the neck N into the mechanism 6 centrally through the opening 4. If the mechanism 6 is at this time activated magnetically (as described below), the device 1 can be pushed to the full extent down onto the bottle B with the top of the neck N abutting the underside of the cap 3 within the housing 2. Termination of the magnetic activation of the mechanism 6 in this condition leaves the device 1 in the locked state firmly secured to the bottle B, as illustrated by FIG. 4.

The locked state of FIG. 4 can be achieved from the unlocked state of the device 1, by first placing the device 1 with its neck N projecting into the housing 2 centrally of the two sets of legs 7 and 8 as illustrated in FIG. 5. Then, with the legs 7 and 8 grasped together and the mechanism 6 activated, pushing the device 1 fully down on the bottle B draws the legs 7 and 8 progressively into the housing 2. Completion of the full downward pushing followed by termination of the magnetic activation sets the device 1 to the locked state.

The pre-locking state is essentially the same as a state which is achieved during the process of locking the security device 1 to a bottle from the unlocked state, and will be described below following description of the mechanism 6 and its operation throughout that latter process, to bring about locking to the bottle B.

Figure 7:
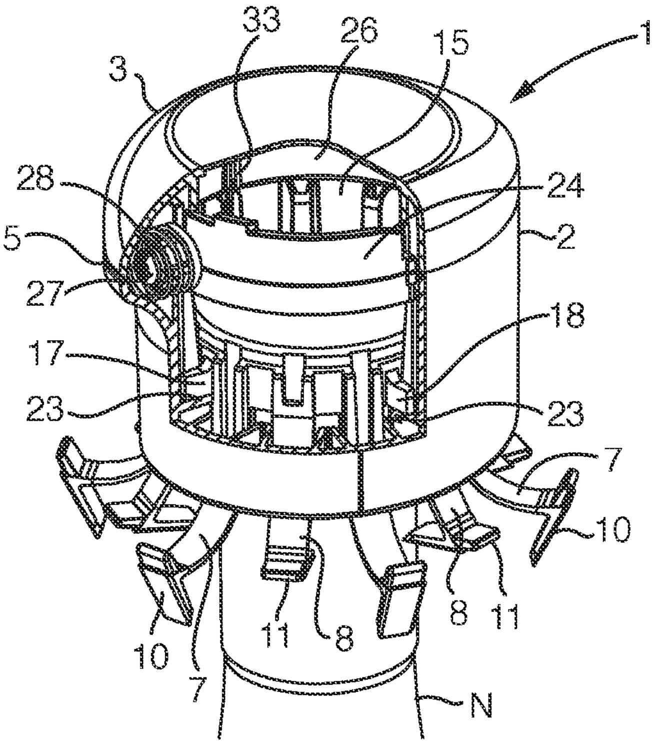
FIGS. 7 and 8 are respectively partial-side and cross-sectional plan views of the security device when in its unlocked and unactivated state, located on the neck of a bottle.
Figure 8:
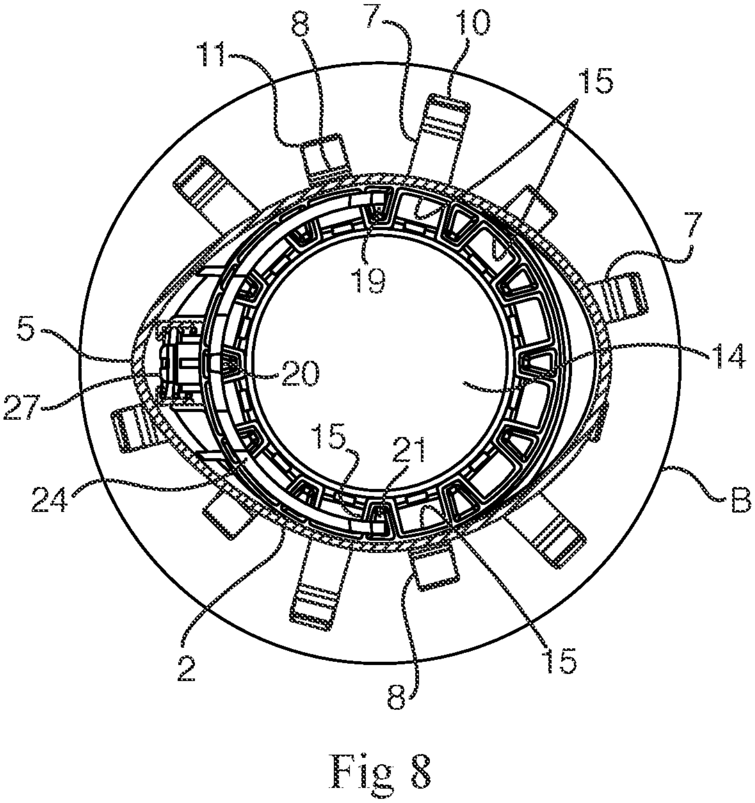

Dealing now in greater detail with the mechanism 6 and its operation, reference is directed initially to FIGS. 6 to 8, in which FIG. 6 shows the device 1 in exploded form, FIG. 7 shows it in side-view partially cut-away located on the neck N of a bottle B, and FIG. 8 is a cross-sectional plan of FIG. 7.

FIG. 6 reveals that the flexible legs 7 and 8 are each secured within the mechanism 6 of the device 1 to a circular slider 14 at equal angular spacings from one another; each leg 7 is thickened at its join with the slider 14 in order to limit the extent to which it can twist widthwise. The twelve legs 7 and 8 extend from the slider 14 to nest lengthwise within twelve channels 15 respectively that are distributed equally from one another running longitudinally of the inside wall of the housing 2.

Three blocking tabs 16 to 18 project radially outwards from the slider 14 with the tab 17 aligned with the nose projection 5. The tab 16 is at right angles to the tab 17 and the tab 18 is located diametrically opposite the tab 16.

The three tabs 16 to 18 slide within individual guide slots 19 to 21 that are each formed within the housing 2 between the longitudinal walls of respective pairs of the channels 15. In the unlocked state, the tabs 16 to 18 abut individual annular shoulders 23 within their respective slots 19 to 21 (the tabs 17 and 18 abutting two of the three shoulders 23 are shown in FIG. 7). This abutment of the three tabs 16 to 18 with the shoulders 23 limits the extent to which the slider 14 can move downwardly within the housing 2.

Figure 9:
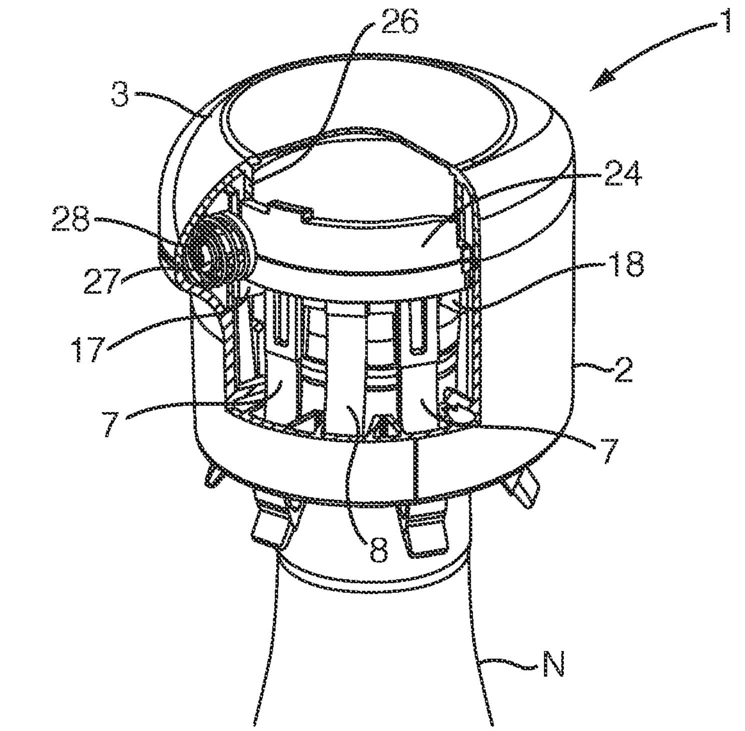
FIGS. 9 and 10 are respectively partial-side and cross-sectional views of the security device when in its unlocked and unactivated state pushed down on the bottle.
Figure 10:
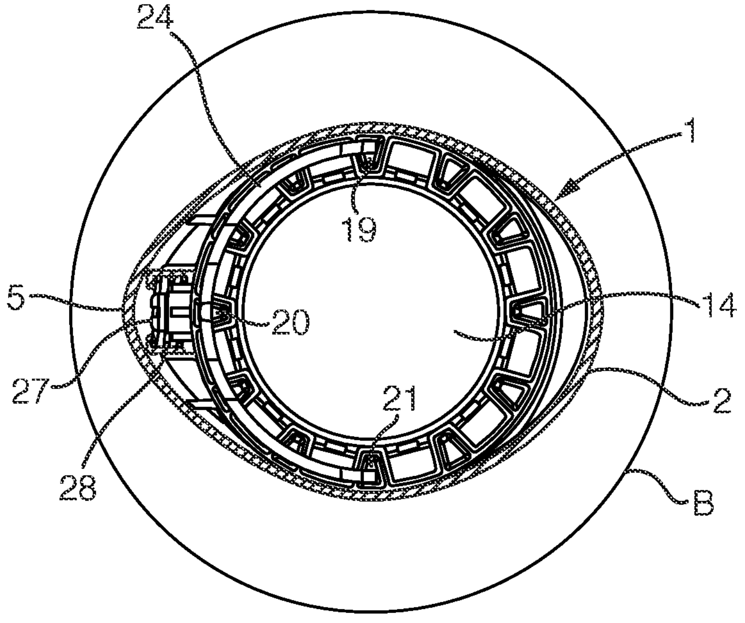

As the device 1 is pushed down onto the top of the bottle B from the unlocked state shown in FIGS. 5, 7 and 8, the slider 14 is pushed upwardly within the housing 2 by the top of the bottle B. This draws the twelve legs 7 and 8 progressively further into their respective longitudinal channels 15, and slides the tabs 16 to 18 upwardly within their guide slots 19 to 21. Full upward movement of the slider 14 within the housing 2 is however blocked (as represented in FIGS. 9 and 10) while the mechanism 6 remains unactivated, by the sliding of the tabs 16 to 18 to the tops of the slots 19 to 21 into abutment with the bottom edge of an arcuate catch 24 (the catch 24 is best seen in FIG. 6).

The arcuate catch 24 extends under the cap 3 across open tops of the guide slots 19 to 21, with a central boss 25 of its arcuate length aligned with the inside of the nose projection 5. While the mechanism 6 remains unactivated, the inside surface of the catch 24 bears conformally, surface-to surface, against the outside surface of a circular lip 26 that depends downwardly from the underside of the cap 3.

A ferromagnetic screw 27 is screwed into the center of the boss 25, and a helically-coiled compression spring 28 is seated on the boss 25 coaxially with the screw 27 to bear on the inside of the housing 2 within the nose projection 5. In the unactivated condition of the device 1, the spring 28 urges the catch 24 firmly against the lip 26, and it is in this position of the catch 24 (represented in FIGS. 7 and 8) that it obstructs upward passage of the tabs 16 to 18 out of their guide slots 19 to 21, and thereby blocks full upward movement of the slider 14 within the housing 2 (as represented in FIGS. 9 and 10).

Figure 11:
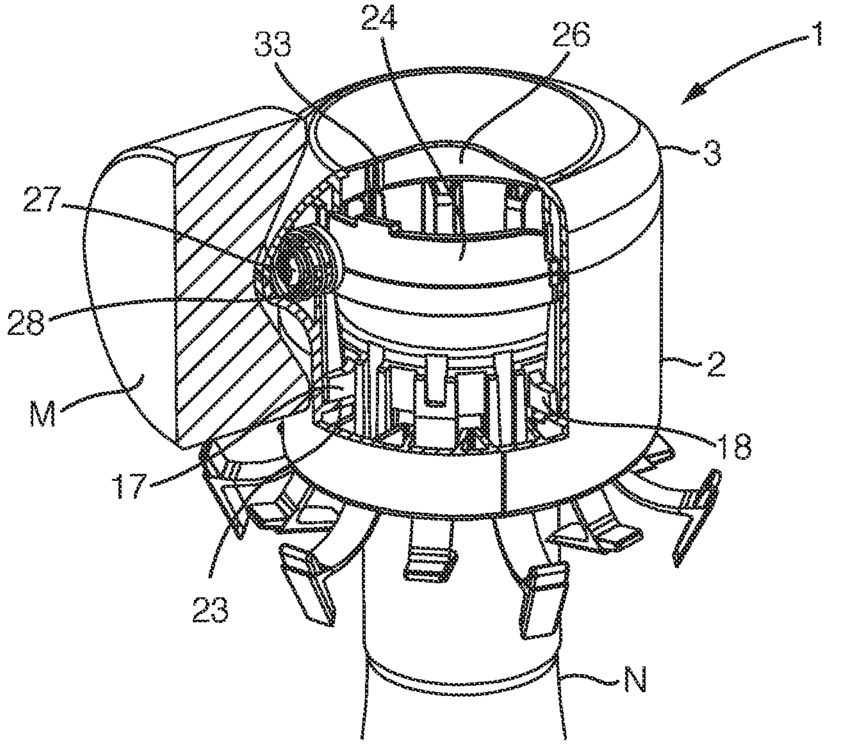
FIGS. 11 and 12 are respectively partial-side and cross-sectional views of the security device when in a pre-locking and activated state before pushing down onto the bottle is resumed.
Figure 12:
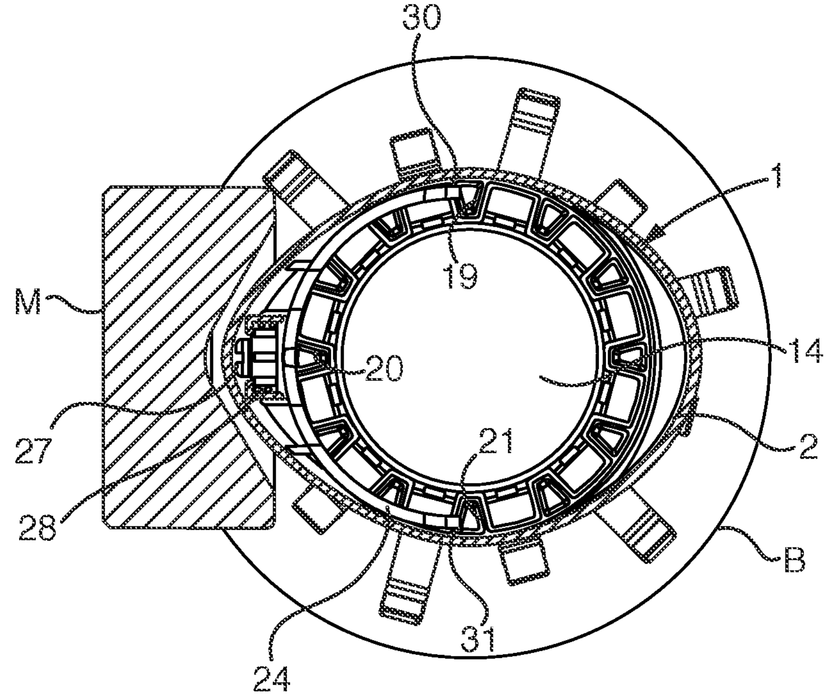

Activation of the device 1 to relieve the obstruction provided by the catch 24, is achieved by bringing the nose projection 5 of the device 1 and a magnet M into close proximity with one another (as represented in FIGS. 11 and 12). The magnet M attracts the screw 27 into the nose projection 5 against the action of the spring 28, causing the catch 24 to be displaced forwardly out of its close abutment with the lip 26. With the catch 24 displaced forwardly in this way, its central region under the boss 25 is clear of the top opening of the slot 20 and its two ends 30 and 31 are clear of the top openings of the slots 19 and 21. As a consequence, while the magnet M is present and the catch 24 of the mechanism 6 is thereby in its displaced, activated condition, the tabs 16 to 18 are no longer obstructed by the catch 24 from longitudinal slots 33 to 35 in the lip 26 that are aligned with the top openings of the guide slots 19 to 21.

Accordingly, resumed pushing of the device 1 down on the bottle B from the blocked condition of the mechanism 6 represented in FIGS. 9 and 10, to the activated condition represented in FIGS. 11 and 12, now frees the slider 14 to slide upwardly within the housing 2 from the previously blocked condition, closer to the underside of the cap 3. The upward movement of the slider 14 lifts the tabs 16 to 18 out of the tops of their respective slots 19 to 21 to enter rectangular cut-out slots 33 to 35 respectively of the lip 26 (for slot 33 see FIGS. 7 and 11, and FIG. 6 for slots 34 and 35). Also, during this further pushing down on the device 1, the legs 7 and 8 are drawn further, fully into the housing 2, against the opposing force of their curved resilience, with their feet 10 and 11 pressing against the neck N of the bottle B.

Figure 13:
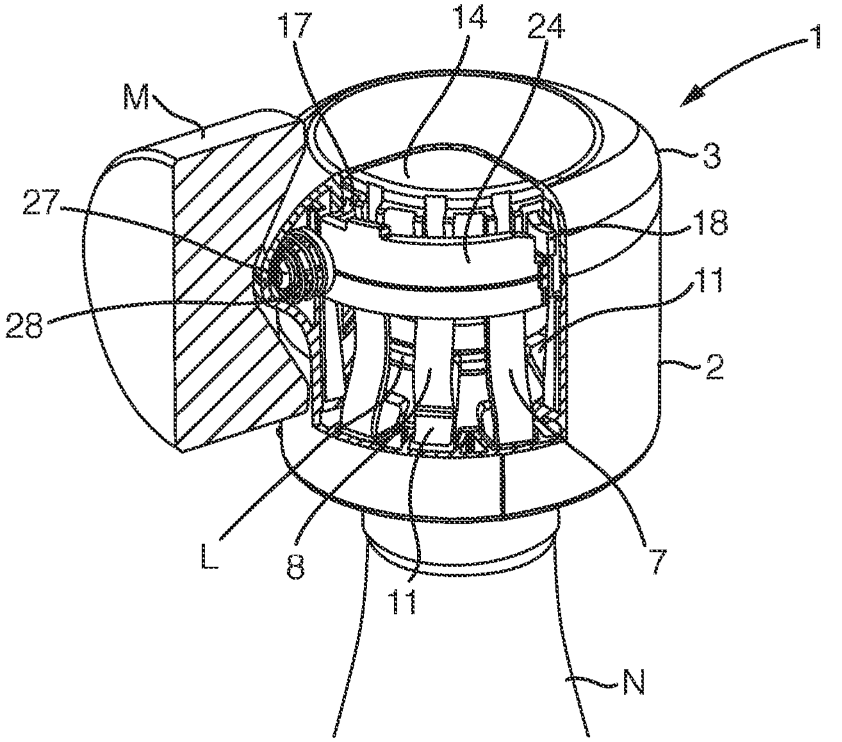
FIGS. 13 and 14 are respectively partial-side and cross-sectional views of the security device when in its locked and activated state during pushing down onto the bottle.
Figure 14:
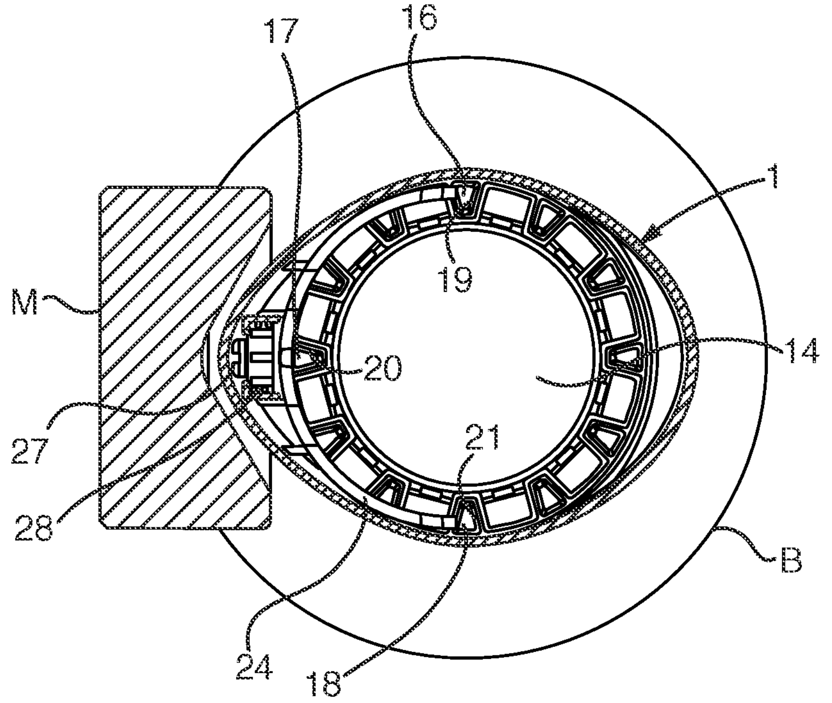

When now, while the downward force on the device 1 is maintained, and just after the condition illustrated by FIGS. 13 and 14, the magnet M and the device 1 are separated from one another to terminate attraction on the screw 27. This allows the catch 24 to return under the action of the helical spring 28 from its displaced condition to the blocking condition it occupied before activation. Thus, when the downward force on the device 1 is subsequently released, the catch 24 will have already moved back into surface-to-surface abutment with the lip 26, and the lifted tabs 16 to 18 will be located in the slots 33 to 35 respectively of the lip 26 and thereby in register with the individual slots 19 to 21.

Accordingly, on release of the downward pressure on the device 1, the slider 14 tends to move downwardly under the resilient action brought about by the confinement of the two sets of legs 7 and 8 within the housing 2, but is restrained from doing so by engagement of the tab 17 in a central slot 36 in the top edge of the catch 24 and engagement of the tabs 16 and 18 within rectangular-notches 37 and 38 respectively at the ends 30 and 31 of the catch 24 (details of the catch 24 are best seen in FIG. 6). In this condition the feet 10 and 11 of one or both sets of the legs 7 and 8 engage under a collar or lip such as L, on the neck N of the bottle to lock the security device 1 firmly to the bottle; engagement of a foot 11 of a leg 8 under lip L is shown in FIG. 13. This engagement, as represented by FIG. 4, precludes removal of the device 1 from the bottle.

Removal of the device 1 from the bottle B can be achieved only by bringing the magnet M and the nose projection 5 back together and pulling the bottle B to withdraw the neck N from within the device 1. The catch 24 adopts its displaced condition in response to the magnet M, and by this the blocking engagement it provides to the tabs 16 to 18 is withdrawn so as to release the slider 14 to slide down the housing 2 under the downward force resulting from the resilient legs 7 and 8 bearing against the inside of the housing 2. This returns the tabs 16 to 18 to abutment with the annular shoulder 23, restoring the device 1 to its unlocked state represented in FIGS. 5, 7 and 8.

The security device 1 can be set to the pre-locking state represented in FIGS. 1 to 3 by displacing the slider 14 without engagement with a bottle, to the locked condition represented in FIG. 8. This condition with the tab 17 located in the slot 36 of the catch 24 and the tabs 16 and 18 in the notched edges 37 and 38 respectively, is a stable state from which the security device 1 can be progressed to the locked state with the feet 10 and or 11 engaged with a bottle, simply by pushing the device 1 down on the neck of the bottle as described above with reference to FIG. 3, while the magnet M and security device 1 are brought together for activation of the device 1.

When security devices such as the device 1 are locked to bottles at the bottle -filling establishment, a greater degree of security against theft is provided over and above the deterrent achieved simply during display and availability at a retail or other sales establishment, since the deterrent also applies to the bottles in bulk at the outset of their transit from the filling establishment to the retail establishment.

Evidence of such a theft, like that from a retail or sales establishment, is provided by the unauthorized existence of a security device locked to a bottle.

The form of security device 1 described above has advantage over known security devices of the above-specified kind in that, importantly, when locked to a bottle, it does not add significantly to the height of the bottle (the addition to height is illustrated, for example, by comparison between the bottle B as represented in FIG. 3 and the overall height of the bottle B with the device 1 locked to it as represented in FIG. 4); more particularly, the added height resulting from the use of the device 1 of the invention need be only slightly more than the thickness of the slider 14 and the thickness of the top wall of the cap 3. This has the advantage therefore, that there is generally *no requirement for change to existing bulk packaging used for the transport of bottles from the filling establishment to the sales establishment, or in the structures used for display and making the bottles available to the public before sale. Moreover, this is of further advantage where the bottles are packaged in individual cartons, since generally no change in the cartons is required.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A security device for locking to a container to block access to content of the container, wherein the security device has a locking mechanism contained within a housing, the locking mechanism comprising:

a spring around a plurality of linear spring supporting ribs, the spring supported by the plurality of linear supporting ribs;

a slider for sliding within the housing between an unlocked state and a locking state; and a catch mounted within the housing for displacement relative to the slider, the catch having a blocking condition in which it blocks sliding of the slider between its unlocked and locking states, and an activated condition in which the catch is displaced from its blocking condition in response to an activating action applied externally to the security device, the catch reverting to its blocking condition on termination of application of the activating action, the catch including a central boss, the central boss including the plurality of linear spring supporting ribs, each of the plurality of linear spring supporting ribs extending lengthwise parallel to an axial centerline of the central boss;

and wherein the slider of the security device further includes one or more flexible legs extending from the slider, and the one or more flexible legs each has an individual foot, the slider, one or more flexible legs and respective individual foot are monolithic.

2. The security device as claimed in claim 1, wherein the slider has one or more tab-projections for abutting the catch when the catch is in its blocking condition, to block sliding of the slider to its locking state from its unlocked state.

3. The security device as claimed in claim 2, wherein the same, or a different one or more tab-projections, abut the catch to block sliding of the slider to its unlocked state from its locking state.

4. The security device as claimed in claim 3, wherein the catch is responsive to application to the security device of an externally-applied magnetic attraction to be displaced from its blocking condition during application of the magnetic attraction.

5. The security device as claimed in claim 4, wherein the catch is returned to the blocking condition by the spring.

6. The security device as claimed in claim 2, wherein the catch is responsive to application to the security device of an externally-applied magnetic attraction to be displaced from its blocking condition during application of the magnetic attraction.

7. The security device as claimed in claim 1, wherein the slider has one or more tab-projections for abutting the catch when the catch is in its blocking condition, to block sliding of the slider to its locking state from its unlocked state.

8. The security device as claimed in claim 7, wherein the catch is responsive to application to the security device of an externally-applied magnetic attraction to be displaced from its blocking condition during application of the magnetic attraction.

9. The security device as claimed in claim 1, wherein the catch is responsive to application to the security device of an externally-applied magnetic attraction to be displaced from its blocking condition during application of the magnetic attraction.

10. The security device as claimed in claim 9, wherein the catch returns to its blocking condition on termination of application of the magnetic attraction.

11. The security device as claimed in claim 10, wherein the catch is returned to the blocking condition by the spring.

12. The security device as claimed in claim 9, wherein the catch is returned to the blocking condition by the spring.

13. The security device as claimed in claim 1, wherein the catch is responsive to application to the security device of an externally-applied magnetic attraction to be displaced from its blocking condition during application of the magnetic attraction.

14. The security device as claimed in claim 13, wherein the catch is returned to the blocking condition by the spring.

15. The security device as claimed in claim 1, wherein the catch is displaced by a ferromagnetic screw.

16. The security device as claimed in claim 15, wherein the catch is returned to the blocking condition by the spring.

17. The security device as claimed in claim 1, wherein the catch is returned to the blocking condition by the spring.

18. The security device as claimed in claim 17, wherein the catch is returned to the blocking condition by the spring.

19. The security device as claimed in claim 1, wherein the security device is for locking to the neck of a bottle.

* * * * *